UNITED STATES PATENT OFFICE.

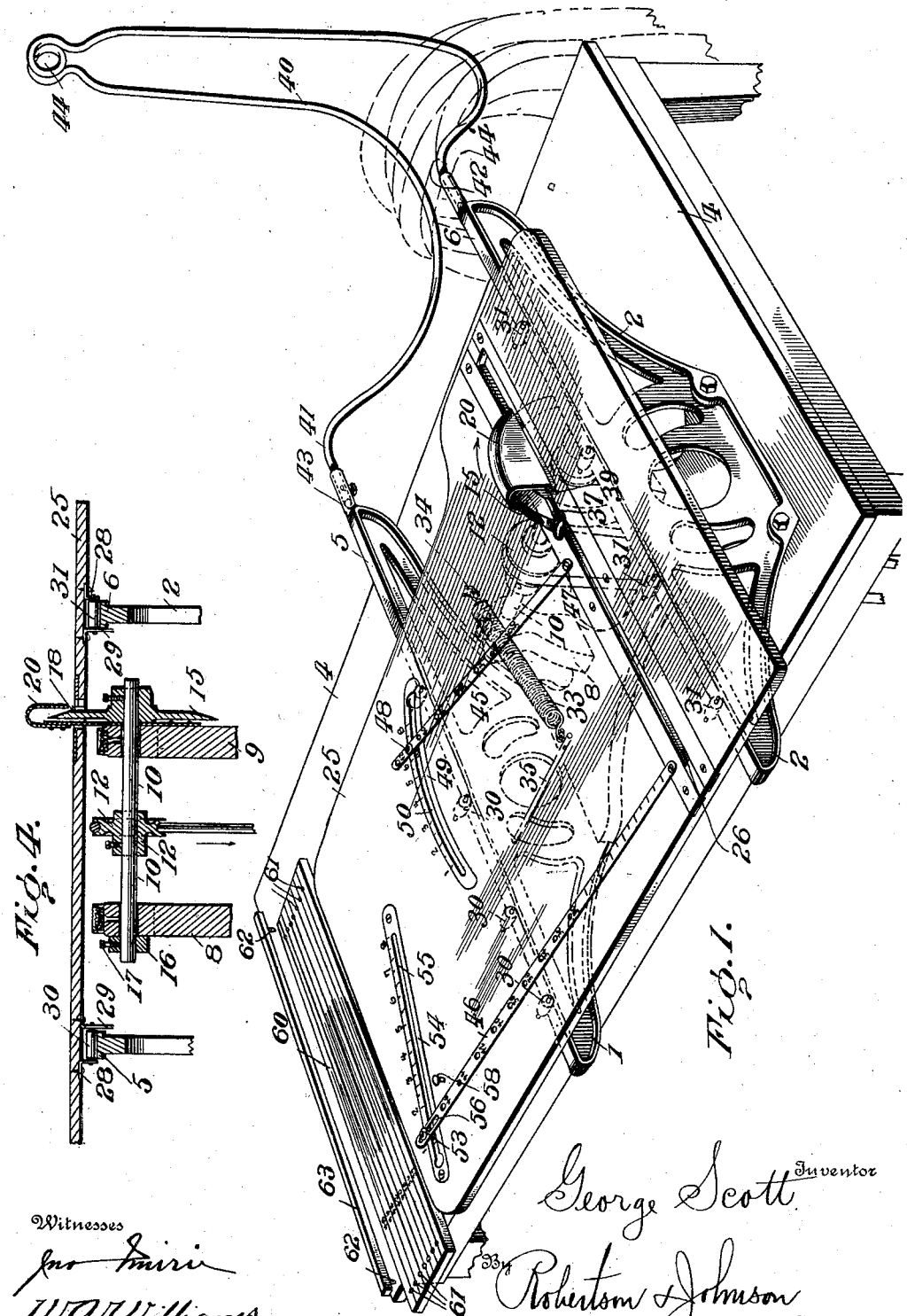

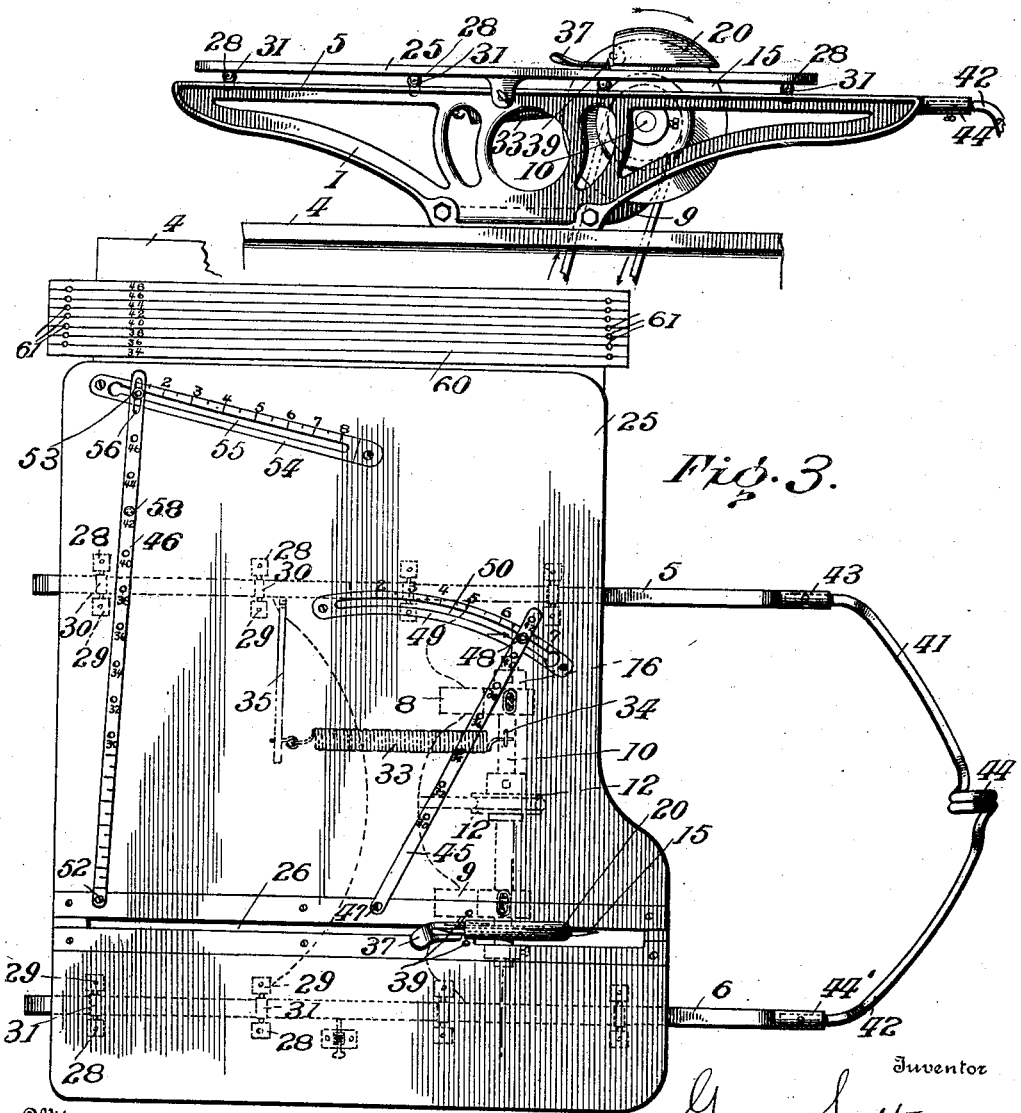

GEORGE SCOTT, OF AMSTERDAM, NEW YORK.

CLOTH-CUTTING MACHINE.

No. 888,755.  Specification of Letters Patent.  Patented May 26, 1908.

Application filed March 13, 1905. Serial No. 249,866.

*To all whom it may concern:*

Be it known that I, GEORGE SCOTT, a citizen of the United States of America, and resident of Amsterdam, in the county of Montgomery, State of New York, have invented certain new and useful Improvements in Cloth-Cutting Machines, of which the following is a specification.

This invention relates to certain new and useful improvements in machines principally adapted for the purpose of cutting cloth, such as knitted fabric for the manufacture of underwear, but the invention is of course not confined to such use.

The objects of my invention are to provide a cutting machine of extremely simple construction and in which it is possible to use a rotary cutter operated from below the table or support for the fabric, and also of a table or support which travels with the material being trimmed or cut.

In the preferable embodiment of my invention I employ a table which may be moved in one direction by the operator and which is returned by a spring (or weight) and with which is combined a simple disk cutter operated from a shaft beneath the reciprocating table or support and which may therefore have its driving shaft supported in fixed bearings. I also prefer that this cutter should rotate in a direction to move the cloth away from instead of jamming it into the slot in the table through which the cutter projects, and in order to permit this, I employ a shield for the cutting disk which supports a finger or fixed blade between which and the cutting disk the material is fed by its movement with the traveling table or support.

My invention therefore consists of a machine for cutting or trimming, having the characteristics just set forth and which will be hereinafter more particularly described in detail and then definitely set forth by the claims at the end hereof.

In the accompanying drawings which I wish it distinctly understood illustrate what I now consider to be the preferable, though not necessary, embodiment of my invention: Figure 1 is a perspective view of my new cutting machine; Fig. 2 is an end elevation of the same; Fig. 3 is a top plan; and Fig. 4 is a vertical section taken through the line of the driving shaft.

Referring now to the details of the drawings by numerals: 1 and 2 designate a pair of suitable supports which are preferably secured to the base 4 of the machine and the upper surface of these supports 1 and 2 are formed into tracks 5 and 6. Between these supports 1 and 2 is a pair of standards 8 and 9 in the upper ends of which are formed bearings for a rotatable shaft 10, this shaft being provided with a pulley 12 from which a belt runs to any suitable source of power. It is of course obvious that instead of using the pulley 12, a small electric motor may be applied to the shaft if preferred. One end of the shaft 10 has fixed to it a rotary disk cutter 15 and on the other end there is a collar 16, adjustable by a set screw 17 for maintaining this shaft and its knife in proper position. Secured to the right hand standard 9 (see Fig. 4) is a sheet metal plate 18 which projects up above the shaft along side of the disk cutter 15. A hood 20, of substantially U-shape is secured to the plate 18 and projects over the cutting edge of the disk cutter 15, as clearly indicated in Figs. 1, 2 and 4.

A shifting or sliding table, or work support 25 is arranged to co-act with the tracks 5 and 6 and the rotary disk cutter 15 as clearly indicated in the drawings. This table or work support is provided with an elongated slot or opening 26 running practically the whole depth of the table and, when the sliding table or work support is placed upon the tracks 5 and 6, the rotary disk cutter 15, its plate 18, and the head 20 project through the said slot or opening 26, all as indicated in Figs. 1 and 4. In order that the table may be worked backward and forward with more facility, I secure to the bottom of the table, angle iron supports 28 and 29 in which are journaled rollers 30 and 31; in order to maintain these rollers in the proper positions on the tracks 5 and 6, one of said angle iron supports for each track, preferably the inner ones 29, are projected downward far enough to co-act with the tracks 5 and 6 and thus keep the table in exactly the proper position to enable said table to be reciprocated backward and forward without any danger of the knife scraping or binding against the walls of the slot 26. In actual practice, the table or work support 25 is shifted in one direction by the operator in the act of cutting, and in order to automatically return said table to its original initial position, I employ a spring 33, one end of which is connected to a hook 34 on the table and the other end to a rod 35 projecting from the left hand support 1. The opening or slot 26 in the work support or table 25 is of sufficient width to permit the passage therethrough of the rotary disk cutter, its plate 18 and the head 20, so that said knife does not co-act with the work support or table to cut the goods resting thereon. But on the contrary, I rotate the disk cutter in the direction indicated by the arrow in Fig. 1; in other words, this rotary disk moves, so far as the surface exposed above the work support or table is concerned, in a direction away from the operator and, therefore, in the same direction as the cloth is moving as it is fed with the table.

In order to provide some device for the knife to cut against, I employ a finger or fixed blade 37 which is secured to or forms part of the hood 20. This fixed blade projects forward of the hood and is slotted so as to embrace the two sides of the disk cutter, as indicated in Fig. 3. Remembering that the disk cutter is rotated in the direction of the arrow, as indicated in Fig. 1, it is easy to be seen that as a piece of goods is laid upon the work support or table 25 and the latter is reciprocated so as to bring the cloth against the rotary disk cutter 15, the cloth is cut between the rotary disk cutter and the fixed blade 37. I deem this of great importance for the reason that if the disk cutter rotated in the opposite direction and one of the walls of the slots 26 co-acted with the said cutter to cut the material, the edges of the material would be dragged or pulled in the slot and thus clog the operation of the machine. In order that the material to be cut may be drawn more readily against the rotary disk cutter 15 and the fixed blade 37, I secure two hooks or pins 39 to the work support or table, one on each side of the slot 26. These pins are pointed and hence very easily penetrate the fabric without damaging it and at the same time sufficiently secure the fabric to draw it with the table, as the operator reciprocates the latter on the ways or tracks 5 and 6.

In order to enable the operator to know just where and how much of the garment is to be cut, I provide guides 45 and 46. Guide 46 has one of its ends pivoted to the reciprocating table as indicated at 47, and at its other end it is provided with a thumb nut 48 which latter co-acts with an inlaid metal guide 49, slotted at 50 and provided with a scale, as clearly indicated in the drawings. The other guide 46 is likewise pivoted to the table as seen at 52 and its other end is similarly provided with a screw and thumb nut 53 which works in an inlaid metal guide 54 provided with a straight slot 55. In order to permit of the free movement of the guide 46 on its pivot 52, I arrange a slot 56 at the end of the guide 46 in order that the guide may be freely moved, and when moved both guides may be secured to the inlaid slotted parts by means of the screws and thumb nuts 48 and 53. The guides 45 and 46 are provided with scale marks, and opposite the marks are perforations within which may be inserted plugs or pegs 58. It will be understood that one of these pegs is provided for each guide and that they may be moved nearer to, or further from, the pivots 47 and 52, in order to provide for different sizes of garments. At the left hand end of the reciprocating table, I provide a stationary sub-table 60 which is built up from the base or main table 4, and this sub-table 60 is provided with a series of perforations and lines marking different sizes. The perforations 61 are to receive lugs 62 projecting from a straight edge 63 and it will be understood that this straight edge 63 may be moved from one to the other of the guide lines to permit operators to trim shirt bodies, etc., to proper lengths or sizes, each line representing a single length or size.

In order to provide the table with a support to hold the garments after they have been trimmed, I form a wire support 40 whose ends 41 and 42 project into sockets 43 and 44' formed on the outer ends of the ways or tracks 5 and 6. This support 40 is preferably formed of one piece of stout wire so that after being formed into a coil 44 which may hold the cord or string arranged to tie the pieces, the ends are bent downwardly into a deep curve and then upwardly in the ends 41 and 42. In actual operation, the operator throws each garment as it is operated upon, into the downwardly curved parts of the support 40, and the string which was formerly around them and which was placed in the loop 44, is again drawn around them to tie them into a bundle to be carried to the next operator.

It is believed the operation of my machine will be obvious to those skilled in the art, and hence no further description is needed except to state that the machine may be modified in many particulars without departing from the scope of my invention.

What I claim as new is:

1. In a cutting machine, a cutting table and a cutter, said table being reciprocable with respect to said cutter, and said cutter rotating in a direction tending to draw the cloth away from the table, substantially as described.

2. In a cutting machine, a cutting table and a cutter, projecting upward through said table, said table being reciprocable with respect to said cutter, in combination with non-rotatable means located above the table for co-acting with the cutter in cutting the material, substantially as described.

3. In a cutting machine, a cutting table and a cutter projecting upward through said table, said table being reciprocable with respect to said cutter, and a stationary blade or member located above the table and co-acting with the aforesaid cutter to cut material traveling with the table, substantially as described.

4. In a cutting machine, a cutting table having a slot therein, a cutter projecting upward through said slot, said table being reciprocable with respect to said cutter, and a stationary blade or member located above the table and co-acting with the aforesaid cutter to cut material traveling with said table, substantially as described.

5. In a cutting machine, a cutting table having a slot therein; a cutter projecting upward through said slot; said table being reciprocable with respect to said cutter; and means for automatically moving said table in one direction, substantially as described.

6. In a cutting machine, a reciprocable or traveling cutting table having a slot therein, a cutter projecting upward through said slot; non-rotatable means above the table for co-acting with said cutter to cut material traveling with said table; and means for automatically moving the table in one direction, substantially as described.

7. In a cutting machine, a reciprocable or traveling cutting table having a slot therein, a cutter projecting upward through said slot; a stationary blade or member located above the table and co-acting with the first-named cutter to cut material traveling with said table; and means for automatically moving the table in one direction, substantially as described.

8. In a cutting machine, a suitable support comprising tracks or ways, a table reciprocable on said ways, and a cutter co-acting with said table to cut material traveling therewith, and said cutter rotating in a direction tending to draw the cloth away from the table, substantially as described.

9. In a cutting machine, a suitable support comprising tracks or ways, a table reciprocable on said tracks or ways and having a slot therein, and a cutter projecting upward through said slot to cut material traveling with said table, and said cutter rotating in a direction tending to draw the cloth away from the table, substantially as described.

10. In a cutting machine, a suitable support comprising tracks or ways, a table reciprocable on said tracks or ways and having a slot therein, a cutter projecting upward through said slot and a stationary blade or member located above the table and co-acting with the first named cutter to cut material traveling with said table, and said cutter rotating away from the table and toward said blade, substantially as described.

11. In a cutting machine, a suitable support comprising tracks or ways, a table reciprocable on said tracks or ways and having a slot therein, a cutter projecting upward through said slot, a stationary blade or member located above the table and co-acting with the first named cutter to cut material traveling with said table, and means for automatically moving the table in one direction, substantially as described.

12. In a cutting machine, a suitable support comprising tracks or ways, a table reciprocable on said tracks or ways and having a slot therein, a cutter projecting upward through said slot, a stationary blade or member located above the table and co-acting with the first named cutter to cut material traveling with said table, and a spring for automatically moving the table in one direction, substantially as described.

13. In a cutting machine, a suitable support comprising tracks or ways, a slotted table reciprocable on said tracks or ways and having rollers bearing on the latter, a cutter projecting upward through said slot, and a stationary blade or member located above the table and co-acting with the first-named cutter to cut material traveling with said table, substantially as described.

14. In a cutting machine, a suitable support comprising tracks or ways, a slotted table reciprocable on said tracks or ways and having rollers bearing on the latter, a cutter projecting upward through said slot, a stationary blade or member located above the table and co-acting with the first-named cutter to cut material traveling with said table, and means for automatically moving the table in one direction, substantially as described.

15. In a cutting machine, a suitable support comprising tracks or ways, a reciprocable table having rollers bearing on said tracks or ways, said table having means co-acting with said ways to guide the same, and a cutter co-acting with said table to cut material traveling therewith, said cutter rotating in a direction tending to move the material away from said table, substantially as described.

16. In a cutting machine, a suitable support comprising tracks or ways, a slotted reciprocable table having rollers riding on said tracks or ways, means for guiding the table on said tracks or ways, and a cutter projecting upward through the slotted table to cut material traveling therewith, said cutter rotating in a direction tending to move the material away from said table, substantially as described.

17. In a cutting machine, a suitable support comprising tracks or ways, a slotted reciprocable table having rollers riding on said tracks or ways, means for guiding the table on said tracks or ways, a cutter projecting upward through the slotted table to cut material traveling therewith, said cutter rotating in a direction tending to move the material away from said table, and means for automatically moving the table in one direction, substantially as described.

18. In a cutting machine, a suitable support comprising tracks or ways, a table reciprocable thereon, a cutter co-acting therewith, and a support for the material to be cut projecting from said tracks or ways, substantially as described.

19. In a cutting machine, a cutting table and a cutter, said table being reciprocable with respect to said cutter, and penetrating means for engaging the material and moving it against said cutter as the table is reciprocated, substantially as described.

20. In a cutting machine, a slotted cutting table, a cutter projecting upward through the slot in said table, a stationary blade or member located above the said table and co-acting with the aforesaid cutter to cut material on the table, said cutter rotating in a direction tending to move the material away from said table and toward said blade, substantially as described.

21. In a cutting machine, a slotted cutting table, a cutter projecting upward through the slot in said table, a hood or shield projecting over said cutter, and a blade or stationary member carried by said hood or shield and co-acting with the aforesaid cutter to cut material on the table, said cutter rotating in a direction tending to move the material away from said table and toward said blade, substantially as described.

22. In a cutting machine, a slotted cutting table, a cutter projecting upward through the slot in said table, a hood or shield projecting over the cutter, and a blade or stationary member carried by said hood or shield and having a slot therein, the cutting edge of said cutter projecting through the slot of said blade and adapted to rotate toward said blade to cut material on said table, substantially as described.

23. In a cutting machine, a reciprocable slotted cutting table, a cutter projecting upward through the slot in said table, a shield or hood projecting over said cutter, a blade or stationary member carried by said shield or hood and co-acting with said cutter to cut material traveling with said table, and penetrating means for causing material to move with the table against the cutter, substantially as described.

24. In a cutting machine, a suitable support comprising tracks or ways, means between said tracks or ways for supporting a rotatable shaft, a slotted table reciprocable on said ways, a cutter carried by said shaft projecting upward through said slot, and a blade or stationary member located above the table, and co-acting with said cutter to cut material traveling with the table, said cutter rotating in a direction tending to move the cloth away from said table, substantially as described.

25. In a cutting machine, a suitable support comprising tracks or ways, means between said tracks or ways for supporting a rotatable shaft, a slotted table reciprocable on said ways, a cutter carried by said shaft projecting upward through said slot, said cutter rotating in a direction tending to move the cloth away from said table, a blade or stationary member located above the table, co-acting with said cutter to cut material traveling with the table, and means for automatically moving the table in one direction, substantially as described.

26. In a cutting machine, a cutting table having a slot therein, a cutter working through said slot, and a measuring guide on the table, with one end pivoted and its other end movable to establish angles, substantially as described.

27. In a cutting machine, a slotted table, a cutter working through said slot, and measuring guides, each having one of their ends pivoted near the slot and its other end movable to establish angles, substantially as described.

28. In a cutting machine, a slotted cutting table, a cutter working through said slot, a slotted plate and a measuring guide having one end pivoted near the slot of the table and its other end co-acting with the slotted plate, substantially as described.

29. In a cutting machine, a cutting table, a cutter co-acting therewith, a measuring guide having one end pivoted near said cutter, and its other end movable, and a peg adapted to be inserted in openings in said measuring guide, substantially as described.

30. In a cutting machine, a reciprocable cutting table, a cutter co-acting therewith, a stationary guide alongside of the cutting table and separate therefrom and an adjustable straight edge co-acting with said guide, substantially as described.

GEORGE SCOTT.

Witnesses:
J. E. WILLIAMS,
C. E. HENDERSON.